US012380737B2

(12) United States Patent
Köhler et al.

(10) Patent No.: US 12,380,737 B2
(45) Date of Patent: Aug. 5, 2025

(54) METHOD FOR DETECTING FORGERY IN FACIAL RECOGNITION AND COMPUTER READABLE MEDIUM AND VEHICLE FOR PERFORMING SUCH METHOD

(71) Applicant: e.solutions GmbH, Ingolstadt (DE)

(72) Inventors: Thomas Köhler, Fürth (DE); Felix Lugauer-Breunig, Erlangen (DE); Veit Pirkl, Erlangen (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 362 days.

(21) Appl. No.: 17/970,151

(22) Filed: Oct. 20, 2022

(65) Prior Publication Data

US 2023/0125437 A1  Apr. 27, 2023

(30) Foreign Application Priority Data

Oct. 22, 2021  (EP) .................................... 21204093

(51) Int. Cl.
*G06V 40/40* (2022.01)
*B60W 30/00* (2006.01)
(Continued)

(52) U.S. Cl.
CPC ............. *G06V 40/45* (2022.01); *B60W 30/00* (2013.01); *G06V 40/171* (2022.01);
(Continued)

(58) Field of Classification Search
CPC .... G06V 40/45; G06V 40/171; G06V 40/172; G06V 40/193; G06V 40/40; B60W 30/00; B60W 2420/403
See application file for complete search history.

(56) References Cited

U.S. PATENT DOCUMENTS

| 8,542,879 B1 * | 9/2013 | Nechyba ............... G06V 40/171 382/118 |
| 10,977,368 B1 * | 4/2021 | Ciubotariu ............ G06F 21/554 |

(Continued)

FOREIGN PATENT DOCUMENTS

| WO | 20170123702 A1 | 7/2017 |
| WO | 20170123702 A8 | 7/2017 |

OTHER PUBLICATIONS

European Search Report issued in connection with corresponding European Application No. 21 20 4093 dated Apr. 5, 2022.

*Primary Examiner* — Wesley J Tucker
(74) *Attorney, Agent, or Firm* — Tarolli, Sundheim, Covell & Tummino LLP

(57) ABSTRACT

A method for detecting forgery in facial recognition is disclosed that comprises selecting (110) an illumination pattern including at least three illumination intensities; controlling (120) a light-emitting device (220) to emit light pulses, according to the illumination pattern; capturing (130) with a camera (210) a respective image of an eye region (15) of a face (10) during each emitted light pulse; determining (140) whether a glint (20) is present in the eye region (15) of each captured image; measuring (150) a glint intensity of each determined glint (20); extracting (160) a respective numerical feature for each captured image, the numerical feature representing a curve of all measured glint intensities at the glint intensity of the respective image; and outputting (180) a signal that the face (10) is forged, if one or more of the extracted numerical features does not correspond to a reference numerical feature. Furthermore, a computer-readable medium storing instructions to perform the method, and a vehicle (1) comprising a processor (250) capable of performing such method.

13 Claims, 4 Drawing Sheets

Figure 1:
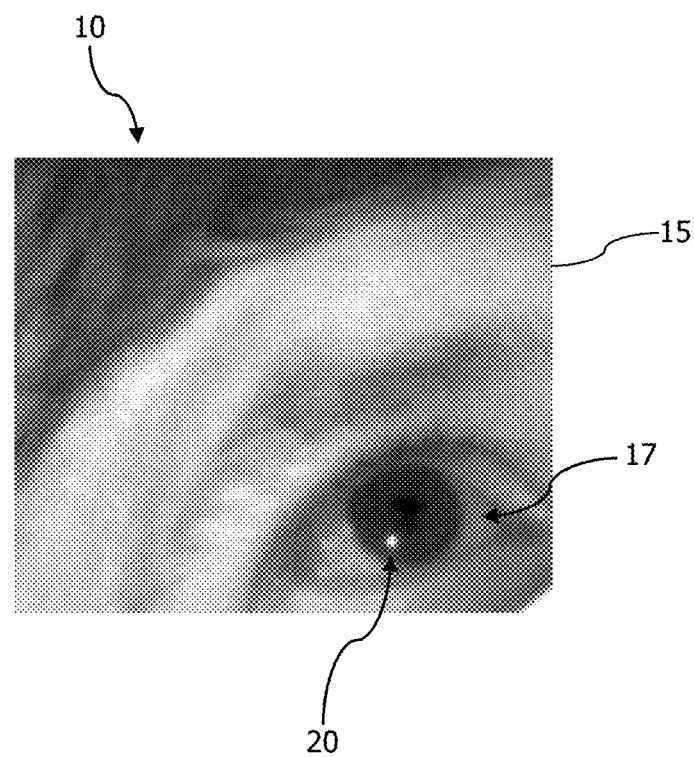

(51) Int. Cl.
  *G06V 40/16* (2022.01)
  *G06V 40/18* (2022.01)
(52) U.S. Cl.
  CPC .......... *G06V 40/172* (2022.01); *G06V 40/193* (2022.01); *B60W 2420/403* (2013.01)

(56) References Cited

U.S. PATENT DOCUMENTS

| | | | |
|---|---|---|---|
| 11,080,516 B1* | 8/2021 | Joshi | G06V 40/19 |
| 2016/0117544 A1* | 4/2016 | Hoyos | G01B 11/22 |
| | | | 348/78 |
| 2017/0091520 A1* | 3/2017 | Ishii | G06V 40/193 |
| 2018/0025213 A1* | 1/2018 | Chandraker | G06V 20/56 |
| | | | 382/118 |
| 2018/0349721 A1 | 12/2018 | Agrawal | |
| 2019/0108383 A1* | 4/2019 | Klingström | G06T 7/74 |
| 2019/0259473 A1* | 8/2019 | Och | G16B 5/00 |
| 2019/0354662 A1* | 11/2019 | Min | G06V 40/45 |
| 2020/0019686 A1* | 1/2020 | Min | H04W 12/65 |
| 2020/0218887 A1* | 7/2020 | He | G06V 40/171 |
| 2020/0349372 A1* | 11/2020 | Lee | G06V 40/169 |
| 2020/0410074 A1* | 12/2020 | Dang | G06V 30/413 |
| 2022/0277311 A1* | 9/2022 | Hegedus | G06Q 20/02 |
| 2024/0046708 A1* | 2/2024 | Refat | G06V 40/171 |

\* cited by examiner

METHOD FOR DETECTING FORGERY IN FACIAL RECOGNITION AND COMPUTER READABLE MEDIUM AND VEHICLE FOR PERFORMING SUCH METHOD

RELATED APPLICATIONS

The present invention is a U.S. Non-Provisional Application which claims priority from European Patent Application No. 21204093.5 filed on Oct. 22, 2021; the entirety of which is hereby incorporated herein by reference.

The present invention relates to a method for detecting forgery in facial recognition, a computer readable medium storing instructions to perform the method, and a vehicle including at least a processor configured to perform such method. In particular, the present invention relates to a method for detecting forgery in facial recognition using light pulses of different intensities, and further relates to a computer readable medium storing instructions to perform the method as well as a vehicle comprising a camera, a light source and a processor configured to perform the method.

Facial recognition is a popular tool for authenticating a user and allowing an authenticated user activating certain functions or using components, devices etc. The facial recognition is based on the capturing of images or videos using conventional hardware, such as a CCD or CMOS sensor, and the extraction of facial features, such as biometric characteristics of a captured face. If the facial features match stored facial features of a pre-authenticated user, the user is allowed access to the functions, components, devices etc.

Such authentication systems are subject of spoofing attacks, for example, in that a printed photo or a video played on a display is presented to the image sensor or camera, or someone else wears a mask mimicking the identity of an authenticated user. Printed photos and video display sometimes allow successful spoofing attacks due to high quality printers and high-resolution displays used for forgery, and due to only two dimensional image or video data being available for the facial recognition.

Thus, the detection of various attack types, such as attacks using a flat print out or flat display, has been addressed by employing 3D sensors to gain a dense depth map for obtaining spatially distributed point patterns and triangulation to gain sparse 3D depth information. Such 3D technology, however, is cost intensive and cannot be installed in all devices.

It is an object of the present invention to provide a cost-effective and still efficient method for detecting forgery in facial recognition as well as computer readable instructions and a vehicle performing such method.

This object is solved by a method comprising the features of claim 1, a computer readable medium comprising the features of claim 10, and a vehicle comprising the features of claim 11.

Preferred embodiments are defined by the dependent claims.

According to a first aspect to better understand the present disclosure, a method for detecting forgery in facial recognition comprises: selecting an illumination pattern including at least three illumination intensities, controlling a light-emitting device to emit light pulses according to the illumination pattern, and capturing with a camera a respective image of an eye region of a face during each emitted light pulse. The illumination pattern defines the number of light pulses emitted by the light-emitting device as well as the illumination intensity of each of the light pulses. There can be a plurality of illumination patterns, from which one is selected. The number of light pulses (equal to or more than three) can be different for each illumination pattern or can be the same.

The capturing of a respective image can include capturing a number of images corresponding to the number of light pulses. Each image is taken simultaneously with a light pulse or at least during a time period including one light pulse emitted by the light-emitting device, according to the illumination pattern. The number of captured images can be equal to or greater than the number of light pulses. The camera can be adjusted manually or automatically to frame the face or the eye region of the face. Alternatively, the camera is provided with a wide angle optical lens and/or is directed to a particular position to be taken by a person whose face is to be captured by the camera. Moreover, the camera can be a digital camera taking a digital image, such as a camera comprising a CCD or CMOS sensor or the like.

The method further comprises: determining whether a glint is present in the eye region of each captured image, and measuring a glint intensity of each determined glint. A glint is a cornea reflection, i.e. a reflection of a light source on the outer surface of the cornea of an eye. In other words, the method comprises determining whether a reflection of the light-emitting device can be found in the eye of the face during a light pulse. The closer the light-emitting device is to the eye, the more prominent is the glint, which facilitates determination of the glint. For instance, the glint is a bright reflection having a small circular shape in the eye. The measuring of the glint intensity can also include measuring that no glint is present, i.e. having an intensity of (almost) zero or below a minimum threshold. Such "glint" may correspond to a light pulse of a (almost) zero intensity, according to the illumination pattern.

The method further comprises: extracting a respective numerical feature for each captured image, the numerical feature representing a curve of all measured glint intensities at the glint intensity of the respective image, and outputting a signal that the face is forged, if one or more of the extracted numerical features does not correspond to a reference numerical feature. The curve of all measured glint intensities depends on the illumination intensities of all light pulses emitted, according to the illumination pattern. For instance, a particular value for each measured intensity may be computed (Y axis) and the computed values may be mapped according to the time between the measurements, i.e. between the light pulses (X axis). The resulting graph forms the curve, from which the numerical feature cannot be extracted at each glint intensity (at each timely position along the X axis corresponding to a light pulse and/or captured image).

This provides for a strong anti-spoofing measure, since the numerical feature does not only depend on the light intensity of a particular light pulse, but further depends on the measured glint intensities of timely adjacent glints/images. Since the latter further depends on the selected illumination pattern, forgery of the numerical feature can be impeded.

As an example only, if a print out of an image of a human face including a glint is hold in front of the camera, the glint intensity does not change or may only vary slightly depending on the illumination intensity, i.e. the reflection intensity of the light reflected by the print out (e.g., paper or photograph) at the position of the glint. A "real" glint, however, varies much stronger, so that the numerical feature of a particular image or light pulse taken from the curve is different for the print out compared to a real glint, and forgery can be detected. Likewise, even if a high resolution display showing an image or video of a face is hold in front of the camera, the displayed "glint" will very likely lead to a different numerical feature than expected.

In an implementation variant, extracting the numerical feature can comprise determining an intensity level of the glint in each captured image, or determining a normalised intensity level of the glint in each captured image, and computing a gradient of the curve defined by the determined intensity levels or the determined normalised intensity levels, or computing a curvature of the curve defined by the determined intensity levels or the determined normalised intensity levels. For instance, an absolute intensity level of the glint in each captured image can be determined, so that any extraction of a numerical feature is based on values or signals directly derivable from the camera (sensor). Alternatively, a normalized intensity level may be used as a calculation basis. Normalizing the intensity level can be based on a maximum intensity of all glints of all captured images or on a minimum intensity of all glints of all captured images. Normalized intensity levels further improve anti-spoofing, since the resulting curve or graph depends on the maximum or minimum intensity of the emitted light pulses, i.e. depends on the selected illumination pattern, which makes it more difficult to predict the resulting curve and hence resulting numerical features.

These intensity values (absolute or normalized) are then used to form the curve or graph, from which the gradient or the curvature is computed at the respective positions of each intensity value along the curve or graph. A gradient or curvature does not only reflect the glint intensity of a particular image, i.e. corresponding to a particular light pulse, but further depends on the glint intensities and, hence, illumination intensities of the light pulses emitted before and after the particular image. Such gradient and curvature can hardly be predicted, so that forgery is impeded.

In another implementation variant, the method can further comprise comparing the numerical feature with the reference numerical feature, wherein the reference numerical feature is associated with the selected illumination pattern. The selected illumination pattern can be stored in advance together with one or more numerical features corresponding to each light pulse defined by the illumination pattern. For instance, using the same illumination pattern, a plurality of faces and/or face(s) at varying distances to the camera can be used to compute a plurality of reference numerical features for the particular selected illumination pattern. This data basis can be used when comparing the numerical feature in a "live" process, in order to detect forgery.

In yet another implementation variant, the comparing can be performed by a machine learning process trained with a plurality of reference numerical features and/or trained with a plurality of illumination patterns. A machine learning process is capable of classifying a plurality of reference numerical features captured and extracted from one illumination pattern as well as from a plurality of illumination patterns. Thus, the machine learning process may easily compare the "live" numerical feature with the reference numerical feature(s). Machine learning process may even not be aware of the selected illumination pattern, but can classify a "live" numerical feature as valid or spoofing, if the machine learning process is well trained, i.e. is trained on the basis of a vast number of illumination patterns and faces.

In a further implementation variant the comparing can comprise comparing a difference between the extracted numerical feature and the reference numerical feature with a threshold, and determining that the extracted numerical feature does not correspond to the reference numerical feature, if the difference is greater than the threshold. In other words, the extracted numerical feature, represented by a certain value or vector or the like can be subtracted from the reference numerical feature value, vector, etc., and the resulting difference can then easily be compared to a threshold. For instance, if the extracted numerical feature deviates from the reference numerical feature by less than 5% or less than 2%, the captured face can be authenticated as a valid user. If the difference is above the threshold (e.g., greater than 2% or greater than 5%), the signal that the face is forged is output.

In another implementation variant, the illumination pattern can define an arbitrary level of illumination intensity for each light pulse. In other words, the illumination intensity of each light pulse can be different from a timely adjacent light pulse, can be the same, can be zero, and/or can corresponds to a maximum light intensity. While conventional anti-spoofing measures may use two varying light intensities timely after one another, an arbitrary illumination intensity level for each light pulse is more difficult to forge. Only as examples, an illumination pattern can define a sequence of intensity levels of 100%, 80%, 60%, . . . , 0% or 0%, 20%, 40%, . . . , 100%, or 100%, 60%, 40%, 0%, 20%, 80%, or 40%, 0%, 100%, 20%, 80%, 60%, etc. (wherein 100% is the maximum intensity level intended or possible for the light-emitting device).

It is to be understood that the number of intensity levels of the above examples can also vary. For example, the number of intensity levels can be three, five, ten, twenty, etc. The number of intensity levels can be chosen in advance, for example, depending on the security level for the authentication and/or the circumstances, such as how much time is available for authentication of the user.

The selecting of an illumination pattern can, hence, comprise selecting one predefined illumination pattern having such illumination intensities. The selecting can be a random selection, in order to impede forgery of glints by predicting the next illumination pattern by a non-authorized user. In order to further increase a security level of the method, the selecting can alternatively or additionally comprise dynamically generating an illumination pattern. This may include selecting a predefined pattern and modify it randomly, such as changing the order of intensities or varying one or more of the intensity levels. It is to be understood, that the method may also be based only on randomly generated illumination patterns (including the number of intensities and/or the intensity level of each light pulse), i.e., without any predefined patterns. Thus, forgery is further hindered as prediction of the pattern is (almost) impossible.

In yet another implementation variant, the method can further comprise illuminating the face with a further light-emitting device emitting a diffused light avoiding the generation of a glint in the eye region. The further light-emitting device can be employed to ensure that the face is visible in general. In order to avoid a second glint, the further light-emitting device can be installed further away than the (first) light-emitting device emitting the light pulses, or can be equipped with a diffuser. In any case, the further light-emitting device helps, for example, to determine a normalized intensity level of the glint. The glint intensity can, for example, be brought into relation of an intensity level of another face region or an average intensity level of the face or a portion thereof.

The further light-emitting device can provide a constant illumination of the face during the entire time period of emitting the light pulses, according to the illumination pattern. Thus, a glint becomes darker with respect to the background, if the illumination intensity level becomes smaller and vice versa. Therefore, a glint is easier to be detected, since other facial regions are only slightly affected by the light pulse, as passive illumination remains constant. These properties can be used to detect glints, for example, by means of image processing, such as using difference images. An artificial glint, e.g., a print out of a face having a glint in an eye is (almost) invariant with respect to the level of pulsed illumination, if illuminated by a further light-emitting device.

Alternatively or additionally, sunlight can provide the diffused light, so that the further light-emitting device may only be employed at night or if not enough sunlight is present.

In a further implementation variant, the method can further comprise estimating a gaze direction of the eye in the eye region of at least one of the captured images.

For instance, a conventional eye tracker technology can be employed, which uses reflections in an eye, such as the glint.

Furthermore, the outputting of the signal that the face is forged can then comprise outputting the signal, if one or more of the estimated gaze direction does not correspond to an expected gaze direction. For instance, the method may further include requesting the user to look in a certain direction, for example, onto a display associated with the light-emitting device and/or camera. Thus, additional security measures can be achieved when detecting forgery in facial recognition.

In yet another implementation variant, the light-emitting device can a emit infrared light. Infrared light can be employed even at night, so that the method can be performed independent of the time of day or the presence of sunlight. Furthermore, the actual anti-spoofing measure is not detectable for the user, so that it is not known when a print out or display has to be placed in front of the camera. In addition, there is no glare irritating the user, such as a driver of the vehicle at night, who may be distracted by the light pulses.

According to a second aspect to better understand the present disclosure, a computer-readable medium is configured to store executable instructions that, when executed by a processor, cause the processor to perform the method according to the first aspect or one or more of the associated implementation variants. For example, the computer-readable medium can be a volatile or non-volatile memory, such as a CD, DVD, USB-stick, RAM, ROM memory or the like.

According to a third aspect to better understand the present disclosure, a vehicle comprises a camera, at least one light emitting device, a storage device storing a plurality of illumination patterns including at least three illumination intensities, and a processor configured to perform the method according to the first aspect or one or more of the associated implementation variants. Thus, facial recognition can be employed in the vehicle for any authentication purposes. The processor may be a dedicated processor or may form part of a vehicle computing system, such as an engine control unit (ECU).

In an implementation variant, the vehicle can further comprise a security system configured to deactivate a vehicle component, if the processor outputs the signal that the face is forged. The vehicle component can, for example, be the engine control unit, so that the engine may not start when the processor outputs the signal.

Thus, a keyless security system for using the car can be implemented. On the other hand, the vehicle component can be an infotainment system, so that for example the infotainment system cannot be activated by a young driver. Other use-cases concern the authorization of payment processes (e.g., for parking or fueling) or the access to personal data (e.g., recent destinations entered in a navigation app) based on face recognition via the infotainment system. Such user requests should be rejected in case of forged facial data.

In an implementation variant the processor is further configured to perform the method each time the vehicle starts a journey.

In another implementation variant, the vehicle can further comprise a driver assistance system including the camera and configured to observe a driver of the vehicle. Some driver assistance systems observe the driver, for example, whether the driver becomes tired or the like. For this reason, a camera is pointed to the driver, which can be used for the anti-spoofing measures of the present disclosure, so that no additional camera and/or light-emitting device is required.

In yet another implementation variant, the vehicle can further comprise a display, wherein the processor is configured to use an illumination of the display as a further light-emitting device. Since a display is usually equipped with a backlight unit providing diffused light or since the display usually emits diffused light, when displaying information, such display can be employed to provide passive illumination of the face. Such passive illumination helps identifying and extracting glints as explained above with respect to the first aspect.

Furthermore, the display can also be used to provide guiding information for the user, for example, to gaze in a certain direction, so that the case direction of the eye can be used as an additional measure for detecting forgery in facial recognition.

According to yet another aspect, an electronic device comprises a processor configured to perform the method according to the first aspect or one or more of the associated implementation variants. Such electronic device can be any handheld device, such as a mobile phone, a tablet computer, a laptop, a PC, etc., or a device mounted into a machine or the like.

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

Figure 2:
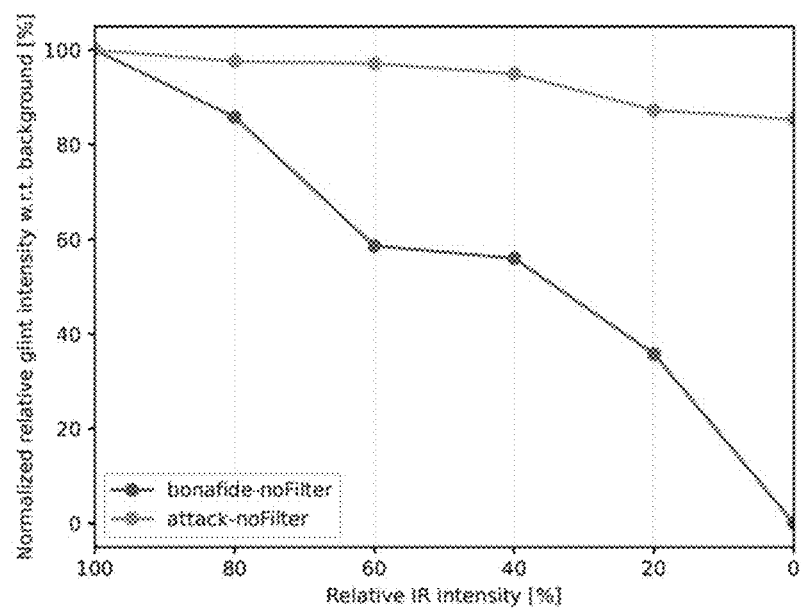
Figure 3:
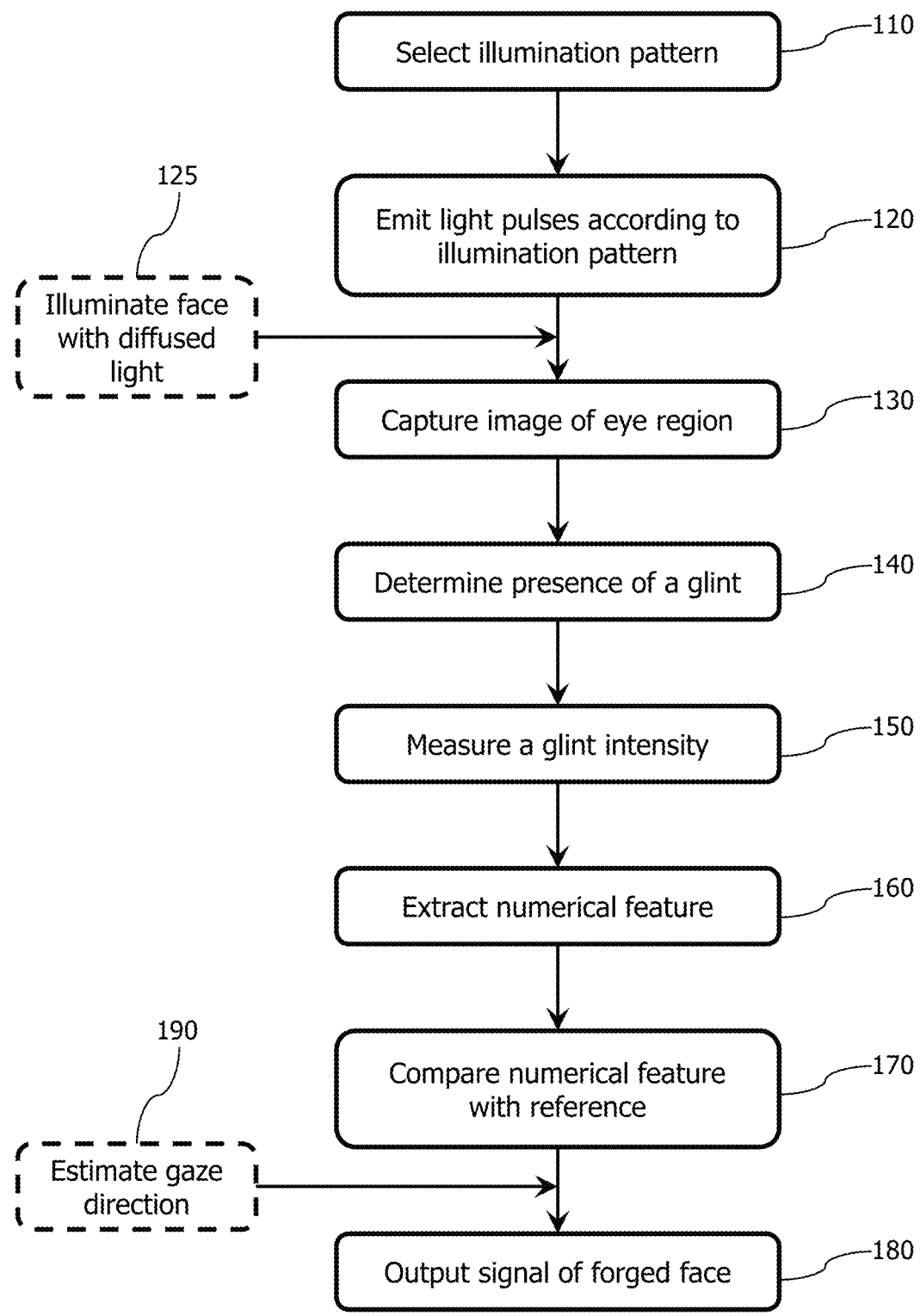
Figure 4:
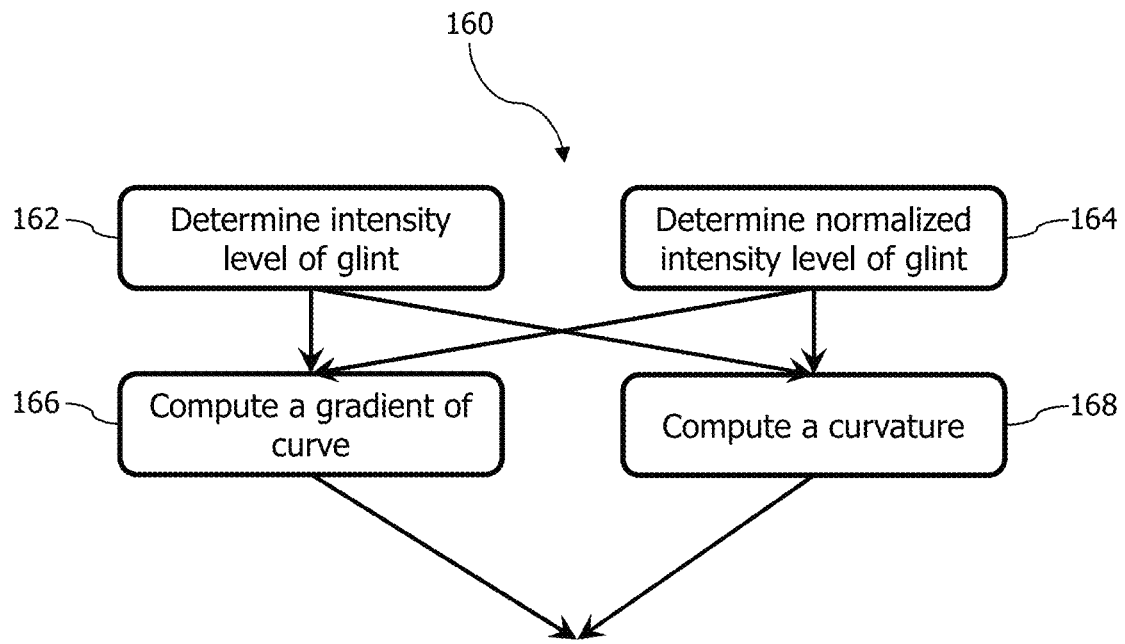
Figure 5:
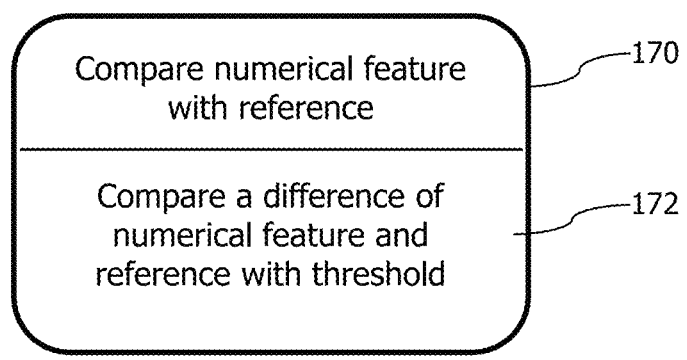
Figure 6:
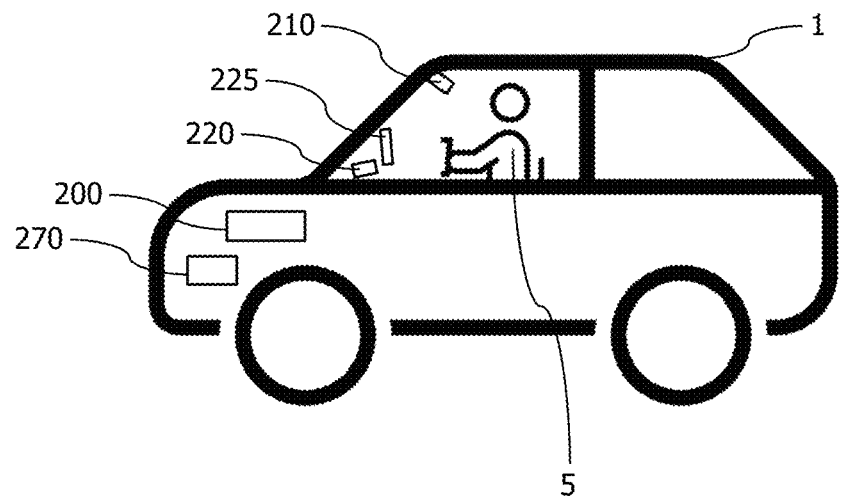
Figure 7:
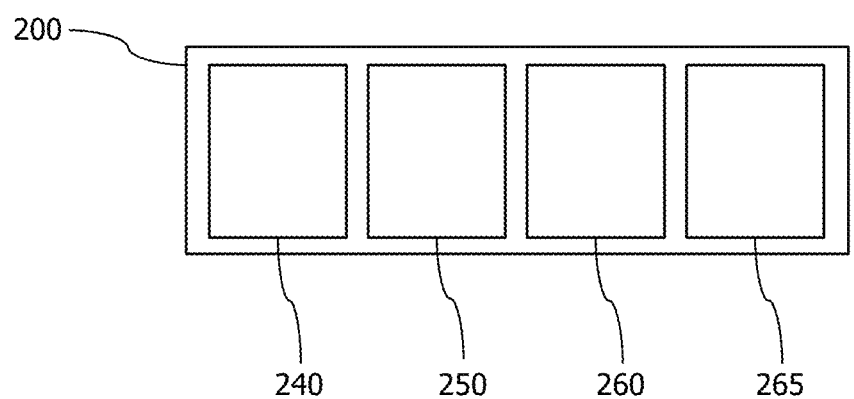

Preferred embodiments of the invention are now explained in greater detail with reference to the enclosed schematic drawings, in which FIG. 1 depicts an image of an eye region of a face, FIG. 2 illustrates a schematic diagram of exemplary glint intensities, FIG. 3 schematically illustrates a flow diagram of a method for detecting forgery in facial recognition, FIGS. 4 and 5 schematically illustrate detailed method steps of the method for detecting forgery in facial recognition, FIG. 6 schematically illustrates a vehicle, and FIG. 7 schematically illustrates an electronic device.

FIG. 1 depicts an image of an eye region 15 of a human face 10, which is only partially shown. The eye region 15 may be found in a larger image based on conventional image processing. Specifically, the eye 17 of a face can be determined due to its specific form and an image region 15 including the eye 17 can then be selected from the larger image.

The face is illuminated by at least one light-emitting device, wherein one light-emitting device forms a reflection 20 in the eye 17, which can be seen as a bright circular spot 20 near the pupil of the eye 17. This reflection 20 is also referred to as a glint 20. Such glint 20 is mainly present, if a spot-like light source emits light towards the cornea of the eye 17 and forms a corresponding reflection on the cornea. The more diffused the light illuminating the face 10 is, the less present or visible will be the glint 20. The present disclosure is directed to the generation of a plurality of glints 20 as will be outlined in more detail with respect to FIGS. 3 to 5, for example, by emitting light pulses towards the eye 17.

FIG. 3 schematically illustrates a flow diagram of a method for detecting forgery in facial recognition. The method begins with selecting (step 110) an illumination pattern including at least three illumination intensities. A light source, such as a light-emitting device 220 (FIG. 6), is then controlled in step 120 to emit light pulses, according to the illumination pattern. Optionally, the face 10 can further be illuminated with a diffused light in step 125, for example, by a further light-emitting device 225 (FIG. 6). While the light source controlled under step 120 emits a light causing a glint 20 in a user's eye 17, the diffused light only illuminates the entire face 10, but without causing a separate glint.

In step 130, a camera 210 (FIG. 6) is used to capture a respective image of the eye region 15 of the face 10 during each emitted light pulse. Thus, for each light pulse at least one image is captured. It is then determined in step 140 whether a glint 20 is present in the eye region 15 of each captured image. In an optimal scenario, each light pulse generates a glint 20, except for a specific light pulse of very low or zero illumination intensity. The determination of a glint 20 may be achieved by image processing, since the glint 20 as shown in FIG. 1 is usually detectable as a bright spot within the eye 17.

Thereafter, a glint intensity of each determined glint 20 can be measured in step 150. As an example only, FIG. 2 shows two curves or graphs, the lower one represents glint intensities measured in step 150 with respect to six light pulses (step 120) in six associated captured images (step 130). In the exemplary illumination pattern, the illumination intensity of the subsequent light pulses decreases from each light pulse to the next by 20% (see X axis values). The measured glint intensity (Y axis values) correspondingly decreases.

Referring back to the method illustrated in FIG. 3, a respective numerical feature is extracted in step 160 for each captured image. The numerical feature represents a curve of all measured glint intensities at the glint intensity of the respective image. In other words, with reference to FIG. 2, the numerical feature of the third captured image (see value "60" on the X axis) represents the curve adjacent on both sides of the glint intensity value (see value of almost "60" on the Y axis). In this particular case, the curve is concave or turns to the left (when viewed along the X axis). In case of the next captured image (see value "40" on the X axis), the numerical feature represents a curve that is convex or turns to the right (when viewed along the X axis).

If one or more of the extracted numerical features for all images, i.e. for all light pulses and measured glint intensities, does not correspond to a references numerical feature, a signal is output that the face 10 is forged in step 180 (FIG. 3). For instance, a print out or a display device may be held in front of the camera 210, wherein the print out or display shows at least an eye region 15 with an eye 17 and even including a glint 20. However, with reference to FIG. 2, the print out (paper/photo) or the display will reflect light of the light-emitting device during each of the light pulses almost in the same manner. This is due to the lack of a "real" glint 20, so that the measuring of a "glint intensity" in step 150 will actually measure the intensity (or brightness) of the print out or display material at the location of the photographed glint.

FIG. 2 exemplarily shows a second graph, i.e. the upper graph, identifying measured light intensities at the time of the six light pulses at the locations of the forged glint. As is derivable from FIG. 2, the "glint intensity" only slightly decreases with the last two measurements, where the illumination intensity, according to the illumination pattern, is very low. However, the measured "glint intensity" is still very high, for example, due to illumination of the print out or display by a further light-emitting device or sunlight or the like. Since the numerical feature extracted from each of the second and further measuring points differs from a references numerical feature, i.e. an expected numerical feature, a face spoofing can be detected and a signal is output in step 180 (FIG. 3) that the face 10 is forged.

FIGS. 4 and 5 schematically illustrate detailed method steps of the method for detecting forgery in facial recognition. Specifically, for extracting the numerical feature in step 160, an intensity level of each respective glint of each captured image can be determined in step 162. This intensity level may be directly taken from the camera (sensor) output or after usual image processing of the sensor signal/data.

Alternatively or additionally, a normalized intensity level of a glint 20 can be determined in step 164 for each captured image. Such normalization may be achieved in various ways, such as with respect to a maximum illumination of the face 10 or eye region 15 at a maximum illumination intensity light pulse, or a corresponding minimum illumination, or with respect to an average illumination of the face or the eye region 15 or any other portion of the image at a time no light pulse is emitted. In FIG. 2, for example, a normalized glint intensity is employed with respect to the background, such as the entire eye region 15. Since the skin of the eye region 15 is quite bright, the forged measured "glint" intensities are at or close to 100%. The real glint intensities of the lower curve decrease in accordance with the decreasing illumination intensities of the light pulses, since the background eye region 15 remains bright during the entire method.

Referring back to FIG. 4, irrespective of the determination in step 162 or 164, the numerical feature extraction 160 can be achieved by computing in step 166 a gradient of the curve defined by the determined intensity levels or normalized intensity levels. Alternatively or additionally, in step 168 the curvature of the curve defined by the determined intensity levels or normalized intensity levels is computed. As can be derived from FIG. 2, such gradient of the curve or curvature significantly differs between the two graphs shown in the diagram of FIG. 2 at each measuring point, i.e. for each light pulse and captured image.

While conventional anti-spoofing measures may compare a difference between a measured light intensity and an expected light intensity with a threshold, such comparison may lead to false positives, for example, for the first two measuring points in FIG. 2. According to the present disclosure, on the other hand, the gradient and curvature differ even for the first measuring point, so that forgery in facial recognition is detected more reliably and also in a more efficient manner.

Turning to FIGS. 3 and 5, the numerical feature extracted for each measuring point is compared in step 170 with a reference numerical feature. The reference numerical feature can be associated with the selected illumination pattern. In other words, when selecting the illumination pattern in step 110, an associated reference numerical feature for each measuring point, i.e. for each light pulse, can be derived (e.g., from a memory also storing the illumination pattern(s)). This reference numerical feature is, hence, an expected numerical feature.

The comparing of the numerical features can further comprise comparing a difference between the extracted numerical feature and the reference numerical feature with a threshold in step 172. It is then determined that the extracted numerical feature does not correspond to the reference numerical feature, if the difference is greater than the threshold, and the signal is output in step 180.

FIGS. 6 and 7 schematically illustrate a vehicle 1 and an electronic device 200, respectively, wherein the electronic device 200 can form part of the vehicle 1. A driver 5 sits in the vehicle 1, for example, on a driver seat. The vehicle comprises a camera 210 capable of taking an image of at least the eye region 15 of the driver 5, and further comprises at least one light-emitting device 220, and a processor 250. The processor 250 is configured to perform the method illustrated in and explained with respect to FIGS. 3 to 5. The electronic device 200 further includes a storage device 240 storing a plurality of illumination patterns including at least three illumination intensities, from which one can be selected in step 110.

The processor 250 can control the light-emitting device 220 to emit light pulses, according to the selected illumination pattern, while the camera 210 captures images of the eye region 15 of the driver 5. The light-emitting device 220 can be an infrared (IR) light emitting device, such as an IR LED, in order to generate the glint 20. Of course, the light-emitting device 220 can emit visible light instead of or additionally to the IR light. The processor 250 can further perform the method steps 140 to 180, in order to determine whether the face 10 captured by the camera 210 is forged or not.

The vehicle 1 can further comprise a security system 260 configured to deactivate a vehicle component 270, if the processor 250 outputs the signal that the face 10 is forged. For instance, the processor 250 can prevent the engine from starting, if a forged face 10 is detected.

Furthermore, a display 225 may be installed in the vehicle 1, which, on the one hand, can be used as a further light-emitting device providing diffused light for illuminating the face 10 of the driver 5. On the other hand, the display 225 can be used to present instructions to the driver 5 on how to use the anti-spoofing system, i.e. the function of the processor 250 when performing the method steps 110 to 180.

In a specific example, the processor 250 can be configured to display instructions on the display 225 to the driver 5 to gaze in a certain direction. In a further method steps 190 (FIG. 3), the processor 250 can estimate, from at least one of the captured images, a gaze direction of the eye 17, for example, on the basis of the determined glint(s) 20. If the estimated gaze direction corresponds to the expected (instructed) gaze direction, a further security measure is available for determining whether the face 10 is forged or not.

The vehicle 1 may also be equipped with a driver assistance system 265, which includes a camera 210 and is configured to observe the driver 5 of the vehicle 1. Such driver assistance system 265 may be configured to control the gaze of the driver 5 or estimate tiredness of the driver 5 by processing images captured from the driver 5, particularly the face 10 of the driver 5. The camera 210 of the driver assistance system 265 as well as an optional display 225 and/or any processing means, such as processor 250) of the driver assistance system 265 can be employed for the disclosed method, so that no redundant devices have to be installed in the vehicle 1.

FIG. 7 schematically illustrates an electronic device 200. While the electronic device 200 is illustrated as comprising a storage device 240, a processor 250, a security system 260, and a driver assistance system 265, this configuration is to be understood as one suitable for a vehicle. The electronic device 200 can also include the camera 210, the light-emitting device 220 and/or the display 225. The security system 260 and/or the driver assistance system 265 may be omitted in a different configuration of the electronic device 200. For example, the electronic device 200 can be a mobile phone, a tablet computer, a laptop, a PC or the like.

The above description of the drawings is to be understood as providing only exemplary embodiments of the present invention and shall not limit the invention to these particular embodiments.

The invention claimed is:

1. A method for detecting forgery in facial recognition, the method comprising:
   selecting an illumination pattern including at least three illumination intensities;
   controlling a light-emitting device to emit light pulses, according to the illumination pattern;
   capturing with a camera a in a set of captured images having at least three captured images of an eye region of a face during each emitted light pulse;
   determining whether a glint is present in the eye region of each captured image of the set of captured images;
   measuring a glint intensity of each determined glint;
   extracting a respective numerical feature for each captured image of the set of captured images, the numerical feature representing a curve of all measured glint intensities at the glint intensity of the respective image; and
   outputting a signal that the face is forged, if one or more of the extracted numerical features does not correspond to a reference numerical feature, wherein extracting the numerical feature comprises:
      determining an intensity level of the glint in each of the at least three captured images of the set of captured images, or determining a normalised intensity level of the glint in each of the at least three captured images; and
      computing a gradient of the curve defined by the determined intensity levels or the determined normalised intensity levels of the at least three captured images, or computing a curvature of the curve defined by the determined intensity levels or the determined normalised intensity levels of the at least three captured images.

2. The method according to claim 1, further comprising:
   comparing the numerical feature with the reference numerical feature, wherein the reference numerical feature is associated with the selected illumination pattern.

3. The method according to claim 2, wherein the comparing is performed by a machine learning process trained with a plurality of reference numerical features and/or trained with a plurality of illumination patterns.

4. The method according to claim 2, wherein the comparing comprises comparing a difference between the extracted numerical feature and the reference numerical feature with a threshold, and determining that the extracted numerical feature does not correspond to the reference numerical feature, if the difference is greater than the threshold.

5. The method according to claim 1, wherein the illumination pattern defines an arbitrary level of illumination intensity for each light pulse.

6. The method according to claim 1, further comprising:
illuminating the face with a further light-emitting device emitting a diffused light avoiding the generation of a glint in the eye region.

7. The method according to claim 1, further comprising:
estimating a gaze direction of the eye in the eye region of at least one captured image of the set of captured images, wherein the outputting of the signal that the face is forged comprises outputting the signal, if one or more of the estimated gaze direction does not correspond to an expected gaze direction.

8. The method according to claim 1, wherein the light-emitting device emits infrared light.

9. A computer-readable medium configured to store executable instructions that, when executed by a processor, cause the processor to perform the method according to claim 1.

10. A vehicle comprising:
a camera;
at least one light emitting device;
a storage device storing a plurality of illumination patterns including at least three illumination intensities; and
a processor configured to perform the method according to claim 1.

11. The vehicle according to claim 10, further comprising:
a security system configured to deactivate a vehicle component, if the processor outputs the signal that the face is forged.

12. The vehicle according to claim 10, further comprising:
a driver assistance system including the camera and configured to observe a driver of the vehicle.

13. The vehicle according to claim 10, further comprising:
a display, wherein the processor is configured to use an illumination of the display as a further light-emitting device.

\* \* \* \* \*